Sept. 9, 1941.   V. TAVONE   2,255,688
ADJUSTABLE SPRINKLER FOR LAWNS
Filed Aug. 16, 1939
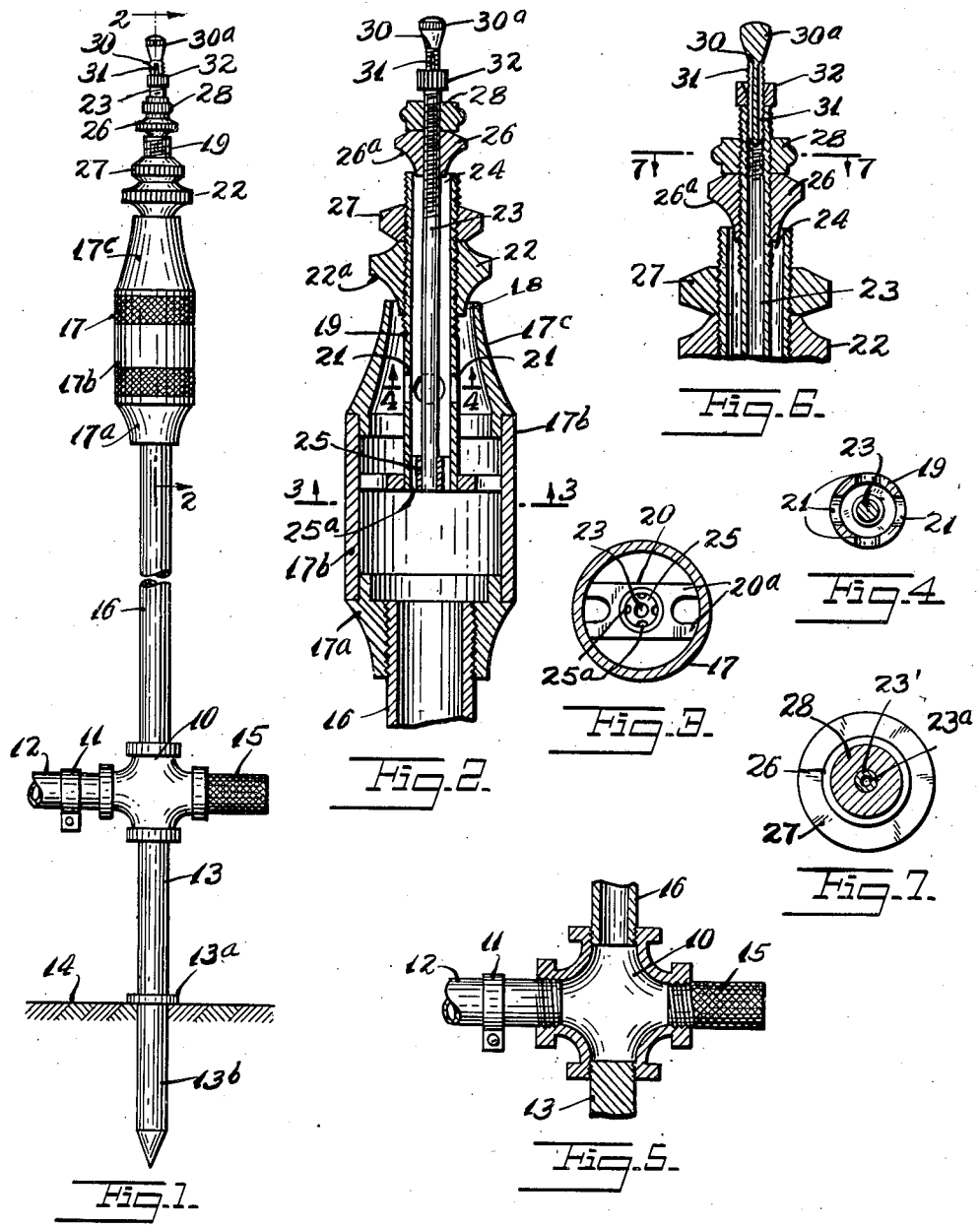
INVENTOR
Vincent Tavone
BY
ATTORNEY Patented Sept. 9, 1941

2,255,688

UNITED STATES PATENT OFFICE 2,255,688

ADJUSTABLE SPRINKLER FOR LAWNS

Vincent Tavone, East Paterson, N. J.

Application August 16, 1939, Serial No. 290,376

1 Claim. (Cl. 299—145)

This invention relates to new and useful improvements in an adjustable sprinkler for lawns.

The invention has for an object the construction of a sprinkler which is characterized by an outer tube extending from the top of a hollow body connected with a supply of water, a spray directing nut mounted upon said outer tube for controlling spraying of water from an area around the tube and within the hollow body, and an inner tube extending coaxially through said outer tube and provided with a spray directing nut for controlling the spraying water which passes through said outer tube, and a headed stud mounted in the outer end of said inner tube for controlling spraying of water passing thru the inner tube.

Still further the invention proposes the provision of holding nuts for holding the "adjustment" of the sprinkler.

Another object of the invention resides in a novel way for supporting the outer tube and inner tubes in relative positions with respect to each other, and in a certain position with respect to said hollow body.

Still further the invention proposes the association of a foot bar arranged in a manner to assist in mounting the sprinkler upon a lawn.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Fig. 1 is a side elevational view of an adjustable sprinkler for lawns constructed according to this invention.

Fig. 2 is a fragmentary enlarged vertical sectional view taken on the line 2—2 of Fig. 1.

Fig. 3 is a horizontal sectional view taken on the line 3—3 of Fig. 2.

Fig. 4 is a horizontal sectional view taken on the line 4—4 of Fig. 2.

Fig. 5 is a fragmentary enlarged vertical sectional view of an intermediate portion of Fig. 1.

Fig. 6 is a fragmentary enlarged detailed view of Fig. 2.

Fig. 7 is a sectional view taken on the line 7—7 of Fig. 6.

The adjustable sprinkler for lawns, according to this invention, includes a pipe fitting 10 connected with a hose coupling 11 adapted to attach a hose 12 to the pipe fitting. A ground engaging peg 13 is mounted in the bottom of the fitting 10. This peg has a flange portion 13ª for resting on the top of the ground 14 and a spike portion 13ᵇ for engaging into the ground. A foot bar 15 is mounted on the side of the fitting 10 so that one may engage his foot thereupon to assist in forcing the ground peg into the ground. A vertical pipe 16 is mounted upon the top of the fitting 10. A hollow body 17 is mounted on the top of the pipe fitting and is provided with an open top end 18. The body 17 is composed of a cylindrical central portion 17ᵇ and end bushings 17ª and 17ᶜ which are press fitted on the central portion.

An outer tube 19 extends through the said open top end 18 and is coaxially arranged thereto and is of a diameter slightly smaller than the said open top to form a passage between the tube and the said open top. This tube 19 is fixedly mounted on the said hollow body 17. More specifically, the tube 19 is fixedly mounted on a bridging element 20 which has prongs 20ª at its sides. This bridging element is disposed transversely within the body 17 and the prongs 20ª are jammed against the inner wall of the body 17 for fixedly holding the bridging element in position. Near the bottom end the tube 19 is formed with several apertures 21 through which water may enter the tube.

A spray directing nut 22 is mounted on the tube 19 for controlling the passage around the tube and within the open top end 18. This nut 22 is threadedly engaged upon the tube 19 so as to be adjustable upwards and downwards to adjustably control the discharge. The spray directing nut 22 has a flared end portion 22ª, with the sides thereof curved so as to direct the spray outwards.

An inner tube 23 extends coaxially through the outer tube 19 and projects from the top end thereof and is of a diameter smaller than the inside diameter of the outer tube so as to provide a passage 24 between the inner tube and the outer tube. This tube 23 is mounted on a plug 25 engaged into the bottom end of the tube 19. The plug 25 has passages 25ª for water to enter the bottom of the outer tube 19. A spray directing nut 26 is threadedly engaged on the upper end of the tube 23 and has flared sides 26ª to direct the spray laterally. This nut 26 may be adjusted upwards and downwards to control the discharge.

A lock nut 27 is threadedly engaged on the tube 19 and normally abuts the top end of the spray directing nut 22 for locking the nut in adjusted positions. Another lock nut 28 threadedly engages the tube 23 and abuts the top of the spray directing nut 26 for locking this nut in fixed positions.

A headed stud 30 is threadedly engaged into the open top end of the inner tube 23. This stud has a head portion 30ᵃ with upwardly flared bottom sides adapted to direct water coming outwards along the stud outwards in a stream. The stud 30 is provided with several longitudinal extending grooves 31 in its sides through which the water may pass from the interior of the tube 23 upwards and against the flared portion of the head 30ᵃ. The stud 30 has threads on its outer side by which it is threadedly mounted in the top end of the inner tube 23.

A tubular bushing nut 32 threadedly engages the stud 30 and is adapted to be screwed down against the top end of the inner tube 23 for locking the stud 30 in an adjusted extended position. It is possible to loosen the nut 32 and then adjust the stud 30 upwards or downwards to obtain a desirable spray. The nut 32 may then be turned down into a locking position. The water which passes up along the grooves 31, passes through the nut 30. This nut is in the form of a bushing having knurling on its outer face.

The operation of the device is as follows:

The sprinkler is mounted upon a lawn as indicated in Fig. 1. Water is supplied through the hose 12. This water will pass into the pipe fitting 10, then up through the vertical pipe 16 and discharge into the hollow body 17. At the lower end, the body 17 is provided with the pressed fitted bushing 17ᵃ to which the upper end of the pipe 16 threadedly engages.

The water entering the hollow body 17 will pass up around and between the open portions of the bridging element 20. Some of the water will continue up and discharge from the passage between the open end 18 of the hollow body and the tube 19. This stream of water will be directed laterally by the spraying nut 22.

Some of the water from the hollow body 17 will pass into the openings 21 and move up through the tube 19 and strike against the spraying nut 26. The two sprays may be adjusted as to size and quantity by adjusting the spraying nuts upwards and downwards, as previously described.

The device is also constructed to present a third spray. This third spray is produced by the water which passes through the inner tube 23, passing up through the longitudinal grooves 31 and striking the flared portion of the head 30ᵃ of the stud to be directed outwards in a spray. This spray may be adjusted as to the direction and quantity by adjusting the stud 30.

While I have illustrated and described the preferred embodiments of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

In a lawn sprinkling device, a vertically disposed hollow body, the wall of said body at the upper end thereof forming an upwardly directed nozzle, a bridge affixed across the interior of said body intermediate the ends thereof, said bridge having openings therethrough, a first hollow pipe having its lower end affixed to said bridge, the upper end of said first hollow pipe projecting above the upper end of said body, the outer diameter of said first hollow pipe being substantially less than the inner diameter of said nozzle whereby to allow passage of water therebetween, a second hollow pipe concentric with the first hollow pipe and having an outer diameter substantially less than the inner diameter of said first hollow pipe, means fixedly mounting the lower end of said second hollow pipe on said bridge, the upper end of said second hollow pipe extending substantially above the upper end of the first hollow pipe, each of said hollow pipes and the space therebetween communicating with the portion of said hollow body below said bridge, threads on the upper portions of each of said hollow pipes, deflector members threaded to each of said hollow pipes for selectively throttling the openings surrounding said pipes, said second hollow pipe having inner threads in the top thereof and a bolt having grooves in the lower portion thereof threaded to the threads in the top of said second hollow pipe for selectively closing said second hollow pipe.

VINCENT TAVONE.